United States Patent [19]

Wadhwa et al.

[11] Patent Number: 5,008,316

[45] Date of Patent: Apr. 16, 1991

[54] INTERNAL LUBRICANT FOR GLASS REINFORCED POLYARYLENE SULFIDE

[75] Inventors: Lachhman Wadhwa, Plainfield, N.J.; Andrew M. Steurer, Kenton, Ky.

[73] Assignee: Hoechst Celanese Corporation, Bridgewater, N.J.

[21] Appl. No.: 403,047

[22] Filed: Sep. 1, 1989

Related U.S. Application Data

[63] Continuation of Ser. No. 159,812, Feb. 25, 1988, abandoned.

[51] Int. Cl.$^5$ .......................... C08K 5/20; C08K 3/40
[52] U.S. Cl. .................... 524/230; 524/456; 524/609; 264/331.11; 264/300
[58] Field of Search .......................... 264/331.11, 300; 524/609, 230

[56] References Cited

U.S. PATENT DOCUMENTS

| | | | |
|---|---|---|---|
| 4,184,997 | 1/1980 | Wu | 524/494 |
| 4,352,904 | 10/1982 | Deyrup | 524/297 |
| 4,365,037 | 12/1982 | Adachi et al. | 524/609 |
| 4,395,509 | 7/1983 | Blackwell et al. | 524/127 |
| 4,408,000 | 10/1983 | Lee | 524/311 |
| 4,409,351 | 10/1983 | Lee | 524/609 |
| 4,436,865 | 3/1984 | Beever | 524/504 |
| 4,482,665 | 11/1984 | Dix | 524/609 |
| 4,530,953 | 7/1985 | Yoshida | 524/311 |
| 4,743,638 | 5/1988 | Bier et al. | 524/609 |
| 4,826,913 | 5/1989 | Nelson | 524/609 |

FOREIGN PATENT DOCUMENTS

| | | | |
|---|---|---|---|
| 101143 | 6/1985 | Japan | 524/230 |
| 149629 | 8/1985 | Japan | 524/230 |

*Primary Examiner*—John C. Bleutge
*Assistant Examiner*—David W. Woodward
*Attorney, Agent, or Firm*—Depaoli & O'Brien

[57] ABSTRACT

Polyarylene sulfide molding compositions are provided with improved mold release properties by the inclusion of an internal lubricant comprising stearyl erucamide.

30 Claims, No Drawings

INTERNAL LUBRICANT FOR GLASS REINFORCED POLYARYLENE SULFIDE

This application is a continuation of application Ser. No. 159,812, filed Feb. 25, 1988, now abandoned.

FIELD OF THE INVENTION

This invention is directed to compositions containing polyarylene sulfide. More particularly, this invention is concerned with molding compositions comprising glass reinforced polyarylene sulfide which have improved mold release properties.

BACKGROUND OF THE INVENTION

Useful articles from various thermoplastic resins have been prepared from molds for many years. Polyarylene sulfide resins are among such moldable compositions and have been prepared, for example, as in U.S. Pat. No. 3,354,129. A relatively recent development has been the use of polyarylene sulfide compositions such as, for example, polyphenylene sulfide compositions, for molding electronic components and as encapsulating materials for electronic components. These compositions typically represent a carefully balanced blend of at least polyarylene sulfide, glass fibers, and filler such as silica or talc. In addition, relatively small amounts of other components such as, for example, colorants, flow improvers, processing aids, organosilanes and the like are typically present. Electronic components are encapsulated to maintain electrical insulation, to provide mechanical protection and to otherwise shield the component from exposure to its environment. As the evolution of electronics continues its rapid advance it becomes increasingly important that the art and technology of encapsulation keep pace. An area of significant concern and interest addressed by the present invention relates specifically to polyarylene sulfide compositions used to make molded electronic parts and to encapsulate electronic components.

Polyarylene sulfide, in particular, polyphenylene sulfide compositions are used to form electronic components and often to encapsulate electronic components in accordance with any encapsulation method suitable for thermoplastic encapsulation compositions. Such methods are well known in the art. One particularly useful method involves introducing the polyarylene sulfide composition into an injection molding apparatus to produce a melt which is extruded into an injection mold wherein the melt is shaped or wherein the electronic component to be encapsulated is positioned. Injection molding provides a convenient way for preparing various articles from polyarylene sulfide, particularly objects of a relatively intricate nature, e.g., electronic components.

In order to injection mold articles in an economic manner, the mold resident cycle time should be kept to a minimum. The shorter cycle time provides a shorter resin heat period with consequently less thermal damage to the resin and/or less thermal promoted interaction between the resin and various additives present in the resin.

In order to accomplish a release of the resin from the mold, various mold release agents have been found which provide for a release of the resin with lower ejection pressure. Mold release agents to be effective should be chemically compatible with the resin as measured by the usual characteristics of the resin under normal conditions and heat treatments.

Mold release of a thermoplastic resin from the mold is generally accomplished by the addition of a mold release spray applied to the mold to provide release of the part from the mold without sticking under standard molding conditions. Alternatively, the thermoplastic resin can be formulated with an internal lubricant which provides inherent mold release properties to the resin. There are many different internal mold release agents in practical use. However, these mold release agents are sometimes disadvantageous. For example, some commercial mold release agents highly effective for improving the mold release property of a thermoplastic resin decrease the mechanical strength of the molded article or discolor the molded article. Other mold release agents which do not degrade the mechanical strength and appearance of the mold article, do not satisfactorily improve the mold release property. Moreover, with respect to the molding or encapsulation of electronic components, it is important that the mold release agent and, generally, any additive, which is incorporated into the thermoplastic resin not add any ionic impurities such as Na, K, Li, Fe, Cl, etc. to the compounded product. There is a continuing need, therefore, to find useful internal lubricants to provide mold release properties to thermoplastic molding compositions. The present invention is directed to finding a useful internal lubricant for polyarylene sulfide.

One particular commercially employed mold release agent for thermoplastic resins, in general, is pentaerythritol tetrastearate (PETS). Several U.S. patents have been granted to the use of PETS as a mold release agent for specific thermoplastic resins.

U.S. Pat. No. 4,408,000 discloses a composition comprising a thermoplastic resin including among others polysulphones, polyethersulphones and polysulfides, a mold release agent such as PETS, and a mold release enhancing effective amount of a fatty acid. With regard to polycarbonate resins, it was found that a combination of PETS and a mixture of fatty acids showed greater mold release than an aromatic polycarbonate containing PETS alone as a mold release agent.

U.S. Pat. No. 4,409,351 illustrates that a fatty acid provides greater mold release to an aromatic polycarbonate than does PETS.

U.S. Pat. No. 4,530,953 utilizes PETS as a mold release agent for polyesters such as polyethylene terephthalate resin.

SUMMARY OF THE INVENTION

An object of the present invention is to provide a polyarylene sulfide resin molding composition reinforced with inorganic fibers and having improved mold release properties.

Another object of the present invention is to provide a polyarylene sulfide resin composition useful for producing molded articles having a satisfactory mechanical strength and appearance.

Still another object of this invention is to provide polyarylene sulfide molding and encapsulation compositions having improved mold release properties.

The above-mentioned objects are attained by providing a polyarylene sulfide resin composition which comprises 25-75% by weight polyarylene sulfide, 5% to 60% by weight of glass or wollastonite fibers, 0–50% by weight filler and 0.01% to 2% by weight of an internal lubricant comprising stearyl erucamide.

DETAILED DESCRIPTION OF THE INVENTION

Uncured or partially cured polyarylene sulfide polymers whether homopolymer, copolymer, terepolymer, and the like, or a blend of such polymers, can be used in the practice of this invention. The uncured or partially cured polymer is a polymer the molecular weight of which can be increased by either lengthening of a molecular chain or by crosslinking or by combination of both by supplying thereto sufficient energy, such as heat. Suitable polyarylene sulfide polymers include, but are not limited to, those described in U.S. Pat. No. 3,354,129, incorporated by reference herein.

Some examples of polyarylene sulfide compositions suitable for the purposes of this invention include poly(2,4-tolylene sulfide), poly(4,4'-biphenylene sulfide) and polyphenylene sulfide. Because of its availability and desirable properties such as high chemical resistance, nonflammability, and high strength and hardness, polyphenylene sulfide (PPS) is the presently preferred polyarylene sulfide. The polyarylene sulfide composition may be a mixture of more than one polyarylene sulfide.

Particularly preferred polyarylene sulfides (PAS) for use in this invention are disclosed in U.S. 4,645,826, the entire content of which is herein incorporated by reference. As disclosed therein a linear PAS of a markedly high molecular weight with a melt viscosity of about some thousands to some tens of thousands poise can be readily produced without the use of an aid by forming a PAS prepolymer of low to medium molecular weight according to a preliminary polymerization, then elevating the temperature by heating the polymerization system under strongly alkaline conditions with addition of a phase separating agent to the polymerization system, thereby separating the system into two liquid phases of high viscosity phase (polymer solution phase) and low viscosity phase (solvent phase), and carrying out the reaction under such a state.

The two-phase separated polymerization comprises dissolving an arylenesulfide prepolymer having a melt viscosity of 5 to 3,000 poise (at 310° C., shearing rate=200 (sec) $^{-1}$) in a poor solvent under a strongly alkaline condition (in a pH range of from 9.5 to 14 of the reaction mixture when diluted 10-fold with water) in a temperature range of from 245° C. to 290° C. into a liquid-liquid two-phase separated state and maintaining this state for 1 to 50 hours to convert the arylenesulfide prepolymer into a high molecular weight polymer, then separating the polymer from the polymerization system and purifying the polymer after neutralization.

The process for production of a high to ultra-high molecular weight PAS according to U.S. Pat. No. 4,645,826 comprises, basically, forming PAS molecules through bonding between an alkali metal sulfide and a dihalo-aromatic compound and/or converting the PAS molecules into a high molecular weight polymer. PPS having melt viscosities of at least 3,000 poise can be produced by the process as disclosed therein including PPS having melt viscosities of at least 7,000 poise and much higher.

The alkali metal sulfide used includes lithium sulfide, sodium sulfide, potassium sulfide, rubidium sulfide, cesium sulfide and mixtures thereof. These alkali metal sulfides can be used as hydrates or aqueous mixtures, or in anhydrous forms. Among these alkali sulfides, sodium sulfide is the least expensive and is commercially preferred. It is also possible to use a small amount of an alkali metal hydroxide in combination in order to neutralize an acidic salt (e.g., alkali metal disulfides and alkali bicarbonates) which may sometimes occur in minute amount in an alkali metal sulfide.

The dihalo-aromatic compound used includes any of dihalo-aromatic compounds as disclosed in Japanese Laid-open Patent Publication No. 22926/1984. Particularly preferred are p-dichlorobenzene, m-dichlorobenzene, 2,5-dichlorotoluene, 2,5-dichloro-p-xylene, p-dibromobenzene, 1,4-dichloronaphthalene, 1-methoxy-2,5-dichlorobenzene, 4,4'-dichlorobiphenyl, 3,5-dichlorobenzoic acid, p,p'-dichlorodiphenylether, p,p'-dichlorodiphenylsulfone, p,p'-dichlorodiphenylsulfoxide, p,p'-dichlorodiphenylketone, and the like. Among these, those composed mainly of para-dihalobenzene, typically p-dichlorobenzene, are especially preferred.

By appropriate selection and combination of dihaloaromatic compounds, a random or block copolymer containing two or more different reaction units can be obtained. For example, when employing p-dichlorobenzene in combination with m-dichlorobenzene or p,p'dichlorodiphenylsulfone, a random or block copolymer containing:

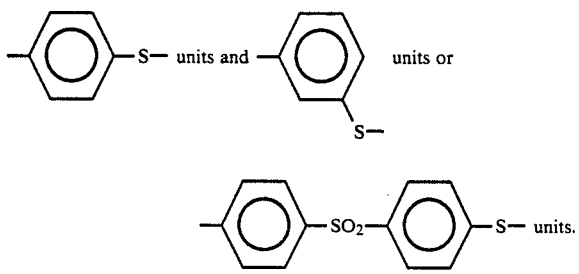

can be obtained. Further, a small amount of a polyhaloaromatic compound (e.g., trichlorobenzene) within the range which may provide some cross-linking but not substantially impair linearity may also be employed in combination, but no such compound is ordinarily required.

The organic amide solvent used in the polymerization step for forming the prepolymer can be selected from N-methylpyrrolidone (NMP), N-ethyl-pyrrolidone, N,N-dimethylformamide, N,N-dimethylacetamide, N-methylcaprolactam, tetramethylurea, hexamethylphosphorotriamide, and mixtures thereof. Among these, N-methylpyrrolidone is particularly preferred from viewpoints such as chemical stability and ability to produce readily a high molecular weight polymer. The organic amide as the polymerization solvent is desirably an aprotic compound. In the polymerization step for forming an ultra-high molecular linear polymer from the prepolymer, the above organic amide can of course be used. Otherwise, it is also possible to employ, for example, aromatic hydrocarbons ($C_6$–$C_{30}$), aliphatic hydrocarbons ($C_6$–$C_{30}$), ethers ($C_6$–$C_{30}$), ketones ($C_5$–$C_{30}$), pyridine or quinoline or derivatives of these ($C_5$–$C_{30}$), and mixtures thereof as such or as mixtures with organic amides.

The polymerization process as described in U.S. Pat. No. 4,645,826 is applicable for not only homopolymerization or random copolymerization but also for block copolymerization. For example, a purified p-phenylene prepolymer and a purified m-phenylene prepolymer can be dispersed in the same polymerization vessel to carry out the two-phase separated polymerization step, whereby a (p-phenylenesulfide)-(m-phenylenesulfide) block copolymer can readily be obtained.

In accordance with a preferred concept of this invention, electronic components are molded or encapsulated with a polyarylene sulfide composition such as, for example, a polyphenylene sulfide composition, which contains fiber reinforcement.

Suitable reinforcing fibers include fibers of glass or calcium silicate, e.g. wollastonite. Although not generally preferred, other reinforcements can be used including glass or calcium silicate in nonfibrous form, e.g. beads, powders, grains, etc., and fibers of other materials such as asbestos, ceramic, etc.

In the present invention, it is essential that the polyarylene sulfide molding composition contain effective amounts of stearyl erucamide to promote release of the molded article from the mold.

When the amount of stearyl erucamide mixed into the polyarylene sulfide resin composition is less than 0.01% by weight, the resultant composition exhibits an unsatisfactory mold release property. If the amount of stearyl erucamide is more than 2% by weight, the resultant molded article may discolor and have a decreased mechanical strength.

The scope of this invention also broadly allows for the inclusion of any desired filler. Fillers can be used to improve the dimensional stability, thermal conductivity and mechanical strength of the composition. Some suitable fillers include, for example, talc, silica, clay, alumina, calcium sulfate, calcium carbonate, mica and so on. The fillers can be in the form of, for example, powder, grain or fiber. In selecting a filler for the polyarylene sulfide compositions of this invention, in particular, compositions used for molding or encapsulating electronic components several factors should be considered. Among these include the electrical conductivity of the filler (the lower the better), tendency of the filler to decompose at molding temperatures, and the level of ionic impurities in the filler.

Besides reinforcing agents and fillers, the compositions of this invention can optionally contain relatively small amounts of other ingredients such as, for example, pigments, flow improvers, and processing aids.

In accordance with one aspect of this invention, the improved polyarylene sulfide compositions can be used to make electronic components such as, but certainly not limited to, connectors, bobbins, coils, relays, etc. This aspect of the invention includes all electronic components that can be at least partially made from a resinous composition such as a polyarylene sulfide composition.

In accordance with another aspect of this invention, electronic components can be encapsulated with the polyarylene sulfide compositions of this invention. The electronic components to be encapsulated in accordance with this aspect of the invention broadly includes all electronic components, i.e. devices, parts, etc., for which encapsulation is desired. Many electronic components have been manufactured or encapsulated with polyarylene sulfide compositions or have been suggested as being capable of made or encapsulated with polyarylene sulfide compositions, and this invention is not intended to be narrow in scope to any specific components mentioned, but include any and all electronic components which can be manufactured from polyarylene sulfide molding compositions.

The polyarylene sulfide compositions of the present invention will comprise in general about 25 to 75 weight percent polyarylene sulfide, 5 to 60 weight percent reinforcing fibers, 0.01 to 2.0 weight percent of an internal lubricant comprising stearyl erucamide and, optionally, 0 to 50 weight percent filler.

A more preferred composition comprises from about 25 to 60 weight percent polyarylene sulfide, 10 to about 45 weight percent reinforcing fibers, 0.1 to 0.8% by weight of the internal lubricant and 10 to 40 weight percent filler.

The above weight percentages are based upon the total amount of the components as above listed for the composition. Other components, including those previous identified, can optionally be present.

The polyarylene sulfide resin composition of the present invention can be prepared, for example, by mixing predetermined amounts of the polyarylene sulfide resin, preferably dried, fibers, and mold release agent by means of a usual mixer, for example, a tumbler mixer; by melt-kneading the mixture by means of a extruder or kneader, and if necessary, by pelletizing the melt-kneaded mixture.

Once made, the composition of the present invention can be used to make molded parts or used to encapsulate electronic components in accordance with any method suitable for thermoplastic encapsulation compositions. Such methods are well known in the art. The composition can be heated to a temperature of at least about the melting point of the polyarylene sulfide and then used to mold the desired components or encapsulate as above described. The compositions of the present invention are especially suited for injection molding wherein the composition is introduced into an injection molding apparatus to produce a melt which is extruded into an injection mold which conforms to the part to be molded or, in the encapsulation method wherein the electronic component to be encapsulated is positioned.

The following example is presented to facilitate disclosure of this invention and should not be interpreted to unduly limit its scope.

EXAMPLE I

Three 40 weight percent glass reinforced Fortron ™ polyphenylene sulfide compositions were prepared and molded into test samples to determine the physical properties thereof as well as the mold release properties of the composition. Fortron ™ is a commercial product made in accordance with the teachings of U.S. Pat. No. 4,645,826. A control did not include a lubricant while the other two compositions contained an internal lubricant comprising pentaerythritol tetrastearate and stearyl erucamide, respectively. Compounding of the compositions was done on a twin screw 53 millimeter ZSK extruder while molding was done on an 8 ounce Reed at a mold temperature of 135° C. The mechanical properties of the test samples are shown in Table I, electrical properties are shown in Table II, and spiral flow results are shown in Table III.

As can be seen from Table I, the two samples which contained the internal lubricants did not stick to the mold in contrast to the control which was found to stick to the mold. The physical properties of all the samples are essentially equivalent indicating that the internal lubricant does not adversely effect the physical properties of polyphenylene sulfide. Tables II and III also show that the properties of the polyphenylene sulfide are not adversly effected by the addition of the lubricants.

TABLE I
EFFECT OF LUBRICANTS ON PROPERTIES OF 40% GLASS REINFORCED POLYPHENYLENE SULFIDE

| LUBRICANT* | NONE | PETS (0.2%) | SE (0.5%) |
|---|---|---|---|
| MOLD STICKING | YES | NO | NO |
| TENSILE | | | |
| Strength, PSI × 10³ | 24.1 | 24.9 | 25.0 |
| Elongation, % | 1.7 | 1.8 | 1.9 |
| FLEXURAL | | | |
| Strength, PSI × 10³ | 36.3 | 37.3 | 37.3 |
| Modulus, PSI × 10⁶ | 2.0 | 2.0 | 2.0 |
| IZOD IMPACT FT-LBS/IN. | | | |
| Notched | 1.8 | 1.7 | 1.7 |
| Unnotched | — | 11.8 | 11.4 |
| HEAT DISTORTION °C. | | | |
| at 264 PSI | 258 | 259 | 259 |
| at 66 PSI | 277 | 278 | 278 |
| SPECIFIC GRAVITY | 1.65 | 1.65 | 1.65 |
| WATER ABSORPTION, % | 0.02 | 0.02 | 0.02 |
| ROCKWELL HARDNESS, M SCALE | 96 | 99 | 100 |

*PETS = Pentaerythritol Tetrastearate
SE = Stearyl Erucamide.

TABLE II
ELECTRICAL PROPERTIES OF PPS COMPOSITIONS

| PROPERTY | CONTROL | PETS (0.2%) | SE (0.5%) |
|---|---|---|---|
| DIELECTRIC STRENGTH, V/MIL | 400 | 464 | 438 |
| DIELECTRIC CONSTANT, 25° C. | | | |
| 1.KHz | 3.6 | 3.5 | 3.5 |
| 10².KHz | 3.6 | 3.5 | 3.4 |
| DISSIPATION FACTOR, 20° C. | | | |
| 1.KHz | 0.0020 | 0.0010 | 0.0013 |
| 10².KHz | 0.0010 | 0.0009 | 0.0011 |
| VOLUME RESISTIVITY, OHM-CM | 1 × 10¹⁶ | 1 × 10¹⁶ | 1 × 10¹⁶ |
| ARC RESISTANCE, SEC. | 136 | 134 | 136 |

PETS (PENTAERYTHRITOL TETRASTEARATE).
SE (STEARYL ERUCAMIDE).

TABLE III
EFFECT OF LUBRICANTS ON SPIRAL FLOW LENGTH

| LUBRICANT | FLOW LENGTH, INCHES |
|---|---|
| None | 13.0 |
| STEARYL ERUCAMIDE (0.5%) | 13.0 |
| PENTAERYTHRITOL TETRASTEARATE (0.2%) | 13.3 |

INJ MOLD: SPIRAL FLOW
MOLD TEMP: 275° F. (135° C.)
MELT TEMP: 590° F. (310° C.)
PRESSURE: 8000 PSI
RESULTS ARE AVERAGE OF 10 SHOTS.

What is claimed is:

1. A molding composition comprising polyarylene sulfide and 0.01 to 2.0 weight percent of an internal lubricant comprising stearyl erucamide to provide said composition with mold release properties.

2. The molding composition of claim 1 further including fiber reinforcement.

3. The molding composition of claim 2, wherein said fiber reinforcement comprises glass or wollastonite fibers.

4. The molding composition of claim 3, including glass fiber reinforcement.

5. The molding composition of claim 3 comprising from about 25 to 75 weight percent polyarylene sulfide, 5 to 60 weight percent glass fibers, 0.01 to 2.0 weight percent of said internal lubricant and 0 to 50 weight percent filler other than said glass fibers.

6. The molding composition of claim 5 comprising from about 25 to 60 weight percent polyarylene sulfide, 10 to 45 weight percent glass fibers, 0.1 to 0.8 weight percent of said internal lubricant and 10 to 40 weight percent filler other than said glass fibers.

7. The molding composition of claim 1, wherein said polyarylene sulfide is polyphenylene sulfide.

8. The molding composition of claim 5, wherein said polyarylene sulfide is polyphenylene sulfide.

9. The molding composition of claim 6, wherein said polyarylene sulfide is polyphenylene sulfide.

10. A molding composition comprising polyphenylene sulfide, reinforcing fibers and 0.1 to 2.0 weight percent of stearyl erucamide to provide said composition with mold release properties.

11. The molding composition of claim 10 wherein said fiber reinforcement comprises glass or wollastonite fibers.

12. The molding composition of claim 11 wherein said fibers are glass fibers.

13. The molding composition of claim 10 wherein said polyphenylene sulfide has a melt viscosity of at least 3,000 poise.

14. The molding composition of claim 10 wherein said polyphenylene sulfide is a copolymer containing a p-phenylenesulfide moiety and an m-phenylenesulfide moiety.

15. The molding composition of claim 10 wherein said polyphenylene sulfide is formed by reaction of an alkali metal sulfide, one or more dihalobenzenes and a trihalobenzene.

16. The molding composition of claim 10 containing from about 25 to 70 weight percent polyphenylene sulfide, 5 to 60 weight percent reinforcing fibers, 0.01 to 2.0 weight percent of stearyl erucamide and 0 to 50 weight percent filler other than said reinforcing fibers.

17. The molding composition of claim 16 comprising from about 25 to 60 weight percent polyphenylene sulfide, 10 to 45 weight percent reinforcing fibers, 0.1 to 0.8 weight percent of stearyl erucamide and 10 to 40 weight percent filler other than said reinforcing fibers.

18. A molding composition comprising linear polyphenylene sulfide, reinforcing fibers and 0.1 to 2.0 weight percent of stearyl erucamide to provide said composition with mold release properties.

19. The molding composition of claim 18 wherein said polyphenylene sulfide has a melt viscosity of at least 3,000 poise.

20. The molding composition of claim 18 wherein said polyphenylene sulfide is a copolymer containing a p-phenylenesulfide moiety and an m-phenylenesulfide moiety.

21. In a method of injection molding a polyarylene sulfide molding composition by melting said composition, extruding said melted composition into an injection mold and removing the molded composition from said mold, the improvement comprising; incorporating into said polyarylene sulfide molding composition 0.1 to 2.0 weight percent of stearyl erucamide to improve the mold release properties of said composition.

22. The method of claim 21, wherein said polyarylene sulfide molding composition comprises fiber reinforcement.

23. The method of claim 22, wherein said reinforcement is glass or wollastonite fiber.

24. The method of claim 23, wherein said reinforcement is glass fiber.

25. The method of claim 22, wherein said polyarylene sulfide is polyphenylene sulfide.

26. The method of claim 23, wherein said polyarylene sulfide is polyphenylene sulfide.

27. The method of claim 24, wherein said polyarylene sulfide is polyphenylene sulfide.

28. The method of claim 25 wherein said polyphenylene sulfide is a linear polyphenylene sulfide.

29. The method of claim 28 wherein said polyphenylene sulfide is a copolymer containing a p-phenylenesulfide moiety and an m-phenylenesulfide moiety.

30. The method of claim 25 wherein said polyphenylene sulfide is formed by reaction of an alkali metal sulfide, one or more dihalobenzenes and a trihalobenzene.

* * * * *